Aug. 26, 1969     A. D. KOMPELIEN     3,463,933
SOLID STATE MOTOR SPEED CONTROL
Filed May 19, 1967
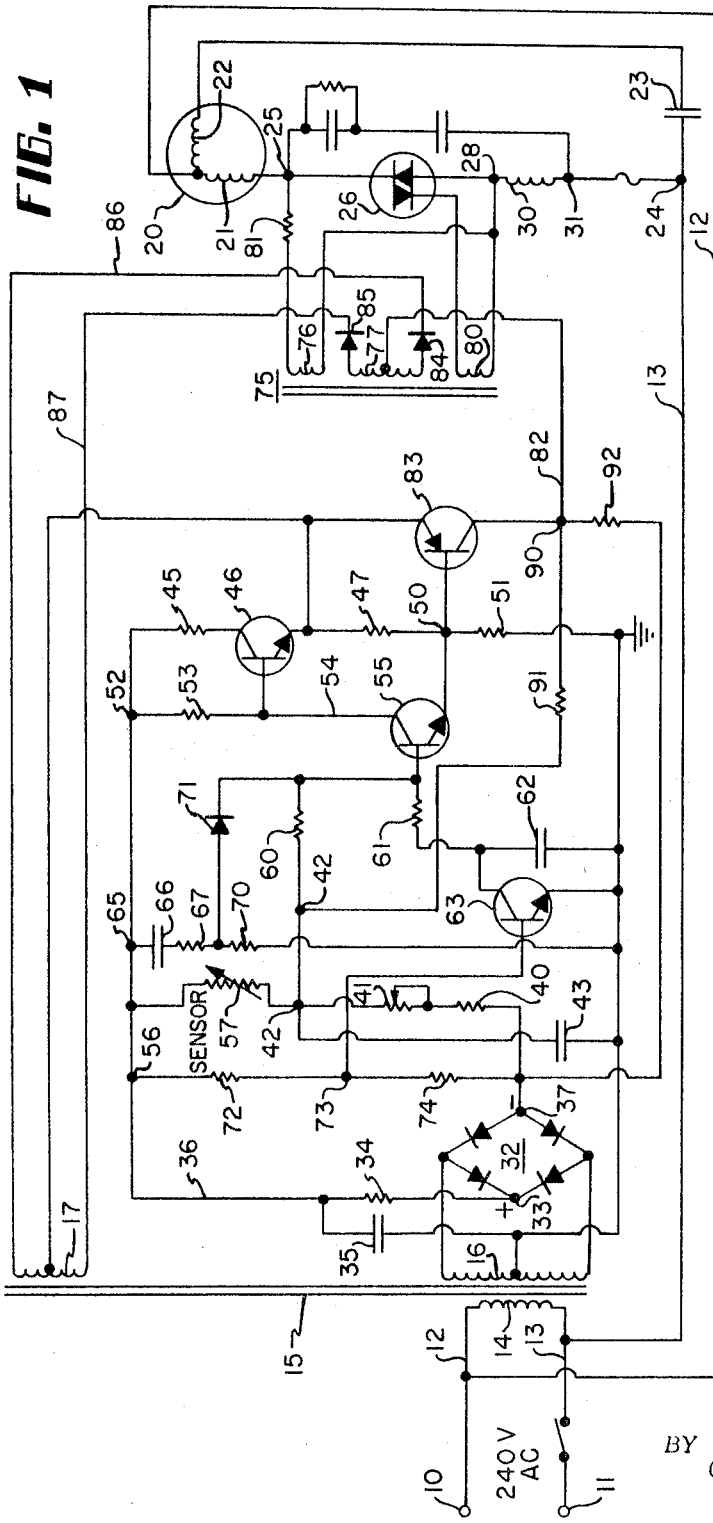
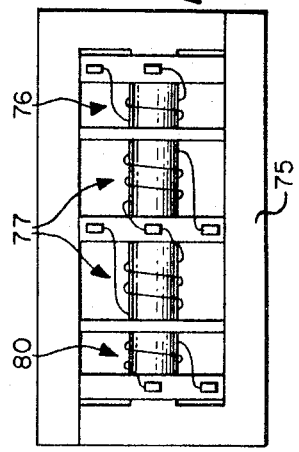
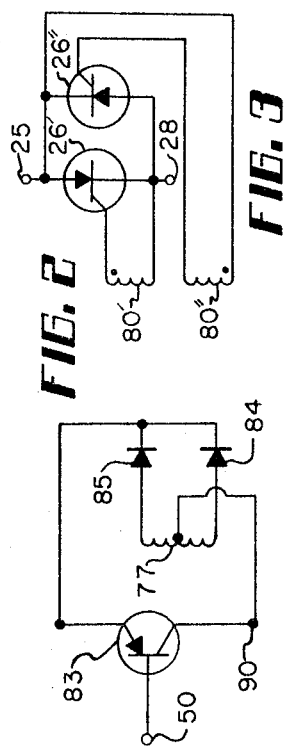
INVENTOR.
ARLON D. KOMPELIEN
BY Osmund R. Dahle
ATTORNEY

3,463,933
SOLID STATE MOTOR SPEED CONTROL
Arlon D. Kompelien, Richfield, Minn., assignor to Honeywell Inc., Minneapolis, Minn., a corporation of Delaware
Filed May 19, 1967, Ser. No. 639,682
Int. Cl. H01h 9/56
U.S. Cl. 307—133                8 Claims

ABSTRACT OF THE DISCLOSURE

A solid-state motor speed control system having the firing angle of a triac or a pair of controlled rectifiers controlled in response to a condition. In order to control an inductive load having a lagging power factor such as an A.C. motor, especially when maximum power is to be delivered to the load, a special circuit provides a triggering pulse to the triac for a full on condition when the sine wave current drops to zero and needs to be triggered for the opposite current direction.

BACKGROUND OF THE INVENTION

This invention pertains to solid-state motor speed control. In controlled rectifiers or triac control of an inductive load having a lagging power factor in which the load current lags the supply voltage by a relatively large amount and in which the angle at which the current lags the voltage may vary with the load conditions, severe problems arise in designing phase-shift circuits which provide proper pulse triggering signals to the SCR's or triac. The problems become acute where the inductive load requires full power so that a triggering pulse is necessary on the gate at the moment the lagging current drops to zero to immediately refire the triac. Conventional pulse firing circuits require some time after current conduction drops to zero to charge timing capacitors for triggering on in the opposite direction so that full power may not be realized at the load. The present invention is tolerant of varying power factors while still providing full on-pulse triggering and also provides full-range control.

SUMMARY OF THE INVENTION

This invention comprises an improved firing circuit for a triac which controls an inductive load. Severe problems arise in providing a suitable and stable pulse turn-on signal for a triac controlling an inductive load such as in a motor speed control arrangement where the voltage and current components may be displaced by as much as 70 electrical degrees. In the present invention a transformer is energized by a current drive from the voltage and is connected to the triac gate to provide a trigger signal. A normally shorted winding on the transformer, this winding being shorted by a transistor with such a low impedance that it virtually absorbs all the ampere turns of the current driven winding, causes the core magnetic flux rate of change to be very low thereby preventing the generation of a trigger voltage. When a triggering voltage is desired, the transistor is turned off.

BRIEF DESCRIPTION OF THE DRAWING

The first figure of the drawing is a schematic representation of the entire motor control system;
FIGURES 2 and 3 are modifications of portions of FIGURE 1; and
FIGURE 4 is a pictorial representation of a portion of FIGURE 1.

DESCRIPTION

Turning now to FIGURE 1 of the drawings, there is disclosed a pair of power input terminals 10 and 11 which are energized from a suitable source of AC power. The primary winding 14 of a power transformer 15 is energized from the input terminals by a pair of conductors 12 and 13. An AC variable speed motor 20, such as a permanet split-phase capacitor motor, has two windings 21 and 22, of which the auxiliary winding 22 is connected through a phase-shift capacitor 23 to the supply conductor 13 at junction 24. The motor may, for example, have a fan as a load. The opposite end of winding 22, which is a common point to both motor windings, is directly connected to the conductor 12. The main winding 21 is connected through a junction 25, a gate controlled bidirectional current conducting semiconductor means 26, a junction 28, and a choke 30 to the supply conductor 13 at junction 24. The gate controlled semiconductor means 26 is shown as a triac capable of conducting current in both directions upon the application of a gate pulse to the device along with the proper application of a potential to the current carrying terminals. The switched current control means known as a triac is well known in the art and will not be described in further detail. A pair of controlled rectifiers, 26' and 26" in parallel inverse relation, may be used equally as well as shown in FIGURE 3.

The center tapped secondary winding 16 of power transformer 15 has its extremities connected to the AC terminals of a bridge-type, full-wave rectifier 32, the center tap of the winding 16 being connected to ground. The positive output terminal 33 of the rectifier 32 is connected through a conventional RC filter network comprising a resistor 34 and a capacitor 35 to provide a filtered positive voltage on the conductor 36 with respect to ground. The negative terminal 37 of the rectifier 32 is connected by means of a resistor 40, a set-point potentiometer 41, a junction 42, and a filter capacitor 43 to ground. A pulsating unfiltered component from negative terminal 37 is also utilized in a reset function and will be described later.

A first active circuit path can be traced from the positive supply terminal 36 through a resistor 45, the collector to emitter of an N-P-N transistor 46, a resistor 47, a junction 50, and a resistor 51 to ground. A further current path can be traced from junction 52 on the conductor 36 through a biasing resistor 53, a conductor 54, the collector to emitter of an N-P-N transistor 55, and from the emitter of transistor 55 to the junction 50. The collector electrode of transistor 55 is also directly connected by the conductor 54 to the base electrode of transistor 46.

In connection with the control bias circuit for the transistor 55, a condition responsive sensing means is disclosed. Specifically, from a junction 56 on the conductor 36 a bias current path for the transistor 55 may be traced through the condition responsive variable impedance sensing means 57, which may be, for example, a temperature responsive means such as a thermistor, to the junction 42, through a resistor 60 to the base electrode of transistor 55. A further circuit may be traced from the base electrode of transistor 55 through a resistor 61 and a capacitor 62 to ground. The junction between resistor 61 and capacitor 62 is directly connected to the collector electrode of an N-P-N transistor 63, the emitter electrode of which is grounded. The transistor 63 is thus in parallel with capacitor 62 and is periodically operated to discharge and reset capacitor 62 as will be described further below.

A start override circuit is also connected to the input of transistor 55 and provides a temporary control signal to transistor 55 during the startup of the apparatus. This circuit may be traced from a junction 65 on the conductor 36 through a capacitor 66, a resistor 67, and a resistor 70 to ground. A junction between the two resistors is connected by means of a diode 71 to the base of transistor 55.

The reset transistor 63 receives its base bias from a voltage divider network which may be traced from the positive conductor 36 through a resistor 72, a junction 73, and a resistor 74, to the negative rectifier terminal 37. The junction 73 is directly connected to the base electrode of reset transistor 63.

A triggering transformer 75 (shown pictorially in FIGURE 4) is uniquely connected to the triac 26 to provide proper pulse triggering to the triac whether the load is resistive or inductive and regardless of how much the load current is displaced from or lags the supply voltage. The transformer 75 comprises a primary winding 76, a center tapped secondary winding 77 which operates as a transformer shorting winding, and a further secondary winding 80. The primary winding 76 is connected in series with a resistor 81, this series combination being in parallel with the current carrying electrodes of the Triac from junction 25 to junction 28. The secondary winding 80 has its lower terminals connected to junction 28 and its upper terminal connected to the gate electrode of the triac.

The triggering transformer shorting winding 77 has its center tap directly connected by a conductor 82 to the collector electrode of a P-N-P transistor 83. The base electrode of transistor 83 is directly connected to the junction 50 and the emitter electrode of transistor 46. The lower extremity of winding 77 is connected through a diode rectifier 84 and a conductor 86 to the upper terminal of compenstaing winding 17 on transformer 15. The upper terminal of winding 77 is connected through diode rectifier 85 and a conductor 87 to the lower terminal of winding 17 of the transformer 15. The center tap of winding 17 is directly connected to the emitter electrodes of transistors 46 and 83. A feedback path is connected from the collector of transistor 83 through a feedback resistor 91 to junction 42.

Transformer winding 17 is a low voltage compensating winding which is designed to develop enough voltage to approximately compensate for the voltage drop across transistor 83, diodes 84 and 85, and the IR drop of winding 77. This may be a magnitude in the order of 1 to 1.5 volts. The use of compensating winding 17 has been found to be advantageous, especially when the gate circuit of the triac is very sensitive. FIGURE 2 shows a simplified connection of transistor 83 to the transformer shorting winding 77 in cases where winding 17 is not needed.

OPERATION

In considering the operation of the motor speed control circuit described above, it may generally be said that regulation of the speed of motor 20 is accomplished by a phase modulation of triac 26. Generally it may also be said that the resistance value of the sensor 57 determines the phase angle at which the triac is fired.

In considering the specific operation of the circuit, consideration will first be given to the trigger transformer 75 which is connected to the triac 26. As has been previously described, the primary winding 76 of transformer 75 is connected in parallel with the current carrying electrodes of the triac, and there is in series with the winding 76 a relatively large resistor 81 which provides a current drive to the winding 76 from the voltage appearing across the triac, but does not draw sufficient current to effect the load. The secondary winding 80 of the transformer 75 is connected to the triac gate to provide at the proper time, each half cycle, a trigger voltage to fire the triac into conduction. The secondary winding 77 is preferably physically located between the primary winding 76 and the secondary winding 80 as is shown in FIGURE 3 and effectively decouples winding 80 from winding 76 whenever a short circuit is placed across winding 77. In other words, the shorting of winding 77 prevents any significant flow of flux to the trigger winding 80.

Another way of explaining the action of the shorted winding 77 is that it presents an extremely low impedance and maintains an extremely low voltage per turn on all of the transformer windings. Specifically, in order to short circuit the winding 77, the transistor 83 is maintained conductive until it is desired to turn on the triac. As soon as the transistor 83 is switched off or nonconductive, so that it now presents a high impedance, the winding 77 no longer loads down the transformer and the volts per turn on the windings of the transformer suddenly increase to provide a trigger signal on winding 80. In one successful embodiment of this invention the number of turns used in the windings of transformer 75 was as follows: winding 76—3,000 turns; winding 77—(each half) 1,000 turns; and winding 80—200 turns.

In considering the circuit of FIGURE 2 in which winding 77 is shorted by the transistor 83, it may be seen that in driving current around the short circuit path, a fraction of a volt is involved in the forward voltage drop of rectifier 84 or 85 and the emitter-collector voltage drop across the transistor so that a perfect short circuit is not obtained across the terminals of winding 77. This means that there may remain a very minute but finite voltage per turn on the transformer windings. For some controlled rectifiers the circuit of FIGURE 2 works well; however, certain triacs have unusually sensitive gate circuits which might occasionally be triggered and therefore the compensating winding 17 is provided. This low-voltage winding, for example, in the order of one volt, provides approximately enough voltage in series with winding 77 to overcome the forward voltage drop across the diode 84 or 85 and the emitter-collector drop of a conductive transistor 83. By this means the short circuit across winding 77 can be made even more effective.

Turning now to the transistor amplifier comprising the transistors 55, 46, and 83, it should be readily recognized that when transistor 55 is off or nonconductive, the transistors 46 and 83 are conductive and that when transistor 55 becomes conductive, the transistors 46 and 83 are turned off. The conduction of transistor 55 is in turn controlled by the voltage existing across capacitor 62. At the beginning of each half cycle of the supply line voltage, the capacitor 62 is reset to zero voltage. This is accomplished by momentarily rendering reset transistor 63 conductive so that the capacitor 62 discharges through the low impedance collector-emitter path of the transistor.

As was previously stated, the reset transistor 63 is biased from a voltage divider comprising resistors 72 and 74. The negative pulsating voltage appearing through resistor 74 predominates and is effective to maintain transistor 63 nonconductive during all but a very small portion of each half cycle. As the supply voltage passes through zero each half cycle, however, the rectified voltage at negative terminal 37 also drops to zero, and at this brief time the positive voltage from load 36 appearing through resistor 72 is effective to turn on transistor 63.

As soon as the reset pulse has disappeared, the transistor 63 turns off and capacitor 62 begins to recharge at a rate determined by the DC voltage on capacitor 43, which in turn is a function of the sensor 57. Thus the smaller the actual resistance of sensor 57 becomes in response to a condition, the more positive the voltage on capacitor 43 becomes and the more rapidly capacitor 62 is charged to the condition level of transistor 55 on each half cycle of the supply voltage. Set point adjustment potentiometer 41 modifies the condition sensing voltage divider and provides for adjustment of the control point of the system. As soon as transistor 55 conducts, the transistors 46 and 83 turn off, and the short circuit is removed from winding 77 for the remainder of the half cycle.

As has been stated above, triac 26 is extinguished when the load current drops to zero at the end of each half cycle. When the load is inductive, the load current lags the applied voltage and therefore the supply voltage has gone through zero and reversed polarity before the load current drops to zero. Since the applied voltage is leading the current, at the instant the current drops to zero and the triac turns off, there is an appreciable voltage appearing across the triac current carrying terminals. This voltage is also applied to primary winding 76 through resistor 81 to produce a new triggering pulse on winding 80. If transistor 83 has already turned off at the time this voltage appears on winding 76, winding 77 has no effect and the trigger pulse on output winding 80 immediately reignites triac 26. If less power to the load is being called for, transistor 83 will still be conductive to short winding 77. The shorted winding 77 will preclude the inducing of any voltage on winding 80 and the trigger pulse will be delayed.

The embodiments of the invention in which an exclusive property or right is claimed are defined as follows:

1. Apparatus for controlling power to a load from an alternating current source comprising:

a pair of power input terminals to be connected to a source of alternating current potential;

gate controlled bidirectional current conducting semiconductor means having current carrying terminals and gate terminal means, said current carrying terminals normally presenting a high impedance and being triggered to a low impedance in response to a gate signal, said current carrying terminals connected to output terminals which are adapted to connect load means to said source;

trigger signal generating transformer means having a primary winding, output winding means, and a shorting winding for controllably disabling said signal generating function of said transformer means;

impedance means connecting said primary winding across said semiconductor means current carrying terminals to energize said primary winding by the potential existing across said terminals when said semiconductor means is in the high impedance state;

circuit means connecting said output winding means to said gate terminal means; and cyclic switching means synchronized to said alternating current source and operated at least briefly to a nonconductive condition at the end of each half cycle of said source, said switching means connected across the terminals of said shorting winding.

2. Apparatus in accordance with claim 1 in which it is intended to control power to an inductive load.

3. Apparatus in accordance with claim 1 in which power is supplied to a variable speed motor load.

4. Apparatus in accordance with claim 1 in which said gate controlled bidirectional current conducting semiconductor means comprises a triac.

5. Apparatus in accordance with claim 1 in which said gate controlled bidirectional current conducting semiconductor means comprises a pair of controlled rectifiers connected in parallel-inverse relation.

6. Apparatus in accordance with claim 1 in which said cyclic switching means comprises a first transistor having collector and emitter electrodes connected across the terminals of said shorting winding, further transistor means connected in controlling relation to said first transistor, and condition responsive resistive-capacitive timing means connected in the bias circuit of said further transistor means said timing means being reset at the end of each half cycle of said source to operate said first transistor to a nonconductive condition.

7. Apparatus in accordance with claim 1 in which said resistive-capacitive timing means includes a temperature responsive element.

8. Apparatus in accordance with claim 1 in which said cyclic switching means comprises semiconductor current switching means having an output circuit and a control circuit, said output circuit being connected across the terminals of said shorting winding, said cyclic switching means further comprising condition responsive impedance means connected in controlling relation to said control circuit.

References Cited

UNITED STATES PATENTS

| 3,283,179 | 11/1966 | Carlisle et al. | 307—133 |
| 3,258,216 | 12/1967 | Kostuch | 323—50 XR |
| 3,363,143 | 1/1968 | Cavanaugh. | |

ORIS L. RADER, Primary Examiner

R. J. HICKEY, Assistant Examiner

U.S. Cl. X.R.

307—239; 318—345; 323—50